(12) United States Patent
Beutin et al.

(10) Patent No.: US 8,136,362 B2
(45) Date of Patent: Mar. 20, 2012

(54) TURBOMACHINE FAN DUCT

(75) Inventors: Bruno Albert Beutin, Evry (FR); Jacky Raphael Michel Derenes, Moissy Cramayel (FR)

(73) Assignee: SNECMA, Paris (FR)

(*) Notice: Subject to any disclaimer, the term of this patent is extended or adjusted under 35 U.S.C. 154(b) by 1217 days.

(21) Appl. No.: 11/856,297

(22) Filed: Sep. 17, 2007

(65) Prior Publication Data
US 2008/0072572 A1 Mar. 27, 2008

(30) Foreign Application Priority Data

Sep. 20, 2006 (FR) .................................. 06 08217

(51) Int. Cl.
*F02C 7/20* (2006.01)
(52) U.S. Cl. ................. 60/796; 60/798; 244/54
(58) Field of Classification Search .................. 60/796, 60/798, 226.1; 244/54, 53 R
See application file for complete search history.

(56) References Cited

U.S. PATENT DOCUMENTS

| | | | |
|---|---|---|---|
| 2,421,689 A | 6/1947 | Elkin | |
| 6,048,171 A * | 4/2000 | Donnelly et al. | 415/145 |
| 7,090,165 B2 * | 8/2006 | Jones et al. | 244/53 R |
| 2004/0223846 A1 * | 11/2004 | Taylor et al. | 415/200 |
| 2005/0172609 A1 * | 8/2005 | Beutin et al. | 60/226.1 |
| 2005/0230532 A1 * | 10/2005 | Stretton et al. | 244/54 |
| 2005/0247043 A1 * | 11/2005 | Derenes et al. | 60/226.1 |
| 2006/0038066 A1 * | 2/2006 | Udall et al. | 244/54 |
| 2006/0101804 A1 * | 5/2006 | Stretton | 60/226.1 |

FOREIGN PATENT DOCUMENTS

| | | |
|---|---|---|
| EP | 0 028 970 A1 | 5/1981 |
| EP | 1 553 263 A1 | 7/2005 |
| EP | 1 568 868 A2 | 8/2005 |

* cited by examiner

*Primary Examiner* — William H Rodriguez
*Assistant Examiner* — Andrew Nguyen
(74) *Attorney, Agent, or Firm* — Oblon, Spivak, McClelland, Maier & Neustadt, L.L.P.

(57) ABSTRACT

A turbomachine fan duct is disclosed. The fan duct includes two coaxial cylindrical walls, these being an internal wall and an external wall, respectively. The internal wall includes a framework to which panels are removably attached, and the external wall includes a single support structure with openings closed by removable panels. The openings in the external wall have dimensions that allow the panels of the internal wall to pass and allow these panels to be fitted onto and removed from the framework of the internal wall.

13 Claims, 5 Drawing Sheets

TURBOMACHINE FAN DUCT

BACKGROUND OF THE INVENTION

The present invention relates to a fan duct for a turbomachine such as an airplane turbojet.

The fan duct of a turbomachine forms part of the nacelle and extends around the turbomachine engine, between the fan and the jet pipe.

It comprises two substantially cylindrical walls which run one inside the other and between them delimit an annular space through which some of the air sucked in by the fan, called the cold stream or the bypass air stream, can flow. The rest of the air sucked in by the fan enters the engine of the turbomachine which, from the upstream end downstream, comprises a compressor, a combustion chamber and a turbine, and forms the hot air stream or primary air stream.

The internal wall of the duct is attached at its upstream end to an intermediate case of the turbomachine and is connected at its downstream end to an exhaust case. It is shaped in such a way as to envelope the turbomachine engine from a short radial distance away and may be in the shape of a barrel when a centrifugal compressor is used in the engine.

The external wall of the duct is attached at its upstream end to the intermediate case and at its downstream end to the upstream end of a thrust reverser which is mounted around the exhaust case. The downstream end of the external wall is also connected to the exhaust case by support and centering means.

DESCRIPTION OF THE PRIOR ART

In the prior art, the internal wall of the duct comprises openings for accessing equipment, such as the fuel injectors and the actuators for variable pitch blades in particular, which are mounted on the turbomachine spool inside the internal wall. The external wall for its part comprises orifices for the passage of auxiliaries which are housed in arms running substantially radially between the internal and external walls of the duct. The openings in the internal wall of the duct are closed off by removably attached panels.

The external wall may have articulated cowls which open for inspection or maintenance operations, or inspection supports closed by bolted-on panels, particularly when the engine is fixed to the fuselage of the airplane.

The operations of mounting the fan duct on the engine are generally lengthy and complicated, as are the maintenance operations which may entail dismantling the fan duct or the engine to some extent.

SUMMARY OF THE INVENTION

It is a particular object of the invention to afford a simple, effective and economical solution to these problems.

To these ends, the invention proposes a fan duct for a turbomachine, comprising two coaxial cylindrical walls, these being an internal wall and an external wall, respectively, which are intended to be attached at one end to an intermediate case of the turbomachine and to be connected at their other end to an exhaust case of the turbomachine, wherein, to make it easier to mount the duct and allow access to equipment mounted on the spool of the turbomachine, the internal cylindrical wall is made up of removable panels attached to a framework comprising an upstream annular structure, a downstream annular structure and longitudinal elements connecting these structures, and wherein the external cylindrical wall comprises openings closed by panels attached removably to a single support structure, these openings having dimensions that allow the panels of the internal wall through and which allow these panels to be mounted on and removed from the framework of the internal wall.

According to the invention, the parts that make up the framework of the internal wall may be fitted and assembled with one another and with the turbomachine spool in such a way as to best spouse the shape of this spool. The support structure of the external wall is advantageously rigid and as a single piece, allowing load to be transmitted between the turbomachine and the airplane fitted with this turbomachine while at the same time making it easier to fix this wall.

The removable panels of the internal wall of the duct may pass through the openings in the external wall, which means that they can be removed without dismantling the support structure of the external wall of the fan duct. Maintenance operations on the equipment located inside the internal wall are simpler and quicker because they can be performed directly through the openings in the external wall. They therefore result in relatively short down-times for the airplane fitted with the turbomachine.

In a preferred embodiment of the invention, the support structure of the external wall comprises an upstream ring and a downstream ring which are rigidly connected by longitudinal members defining the aforementioned openings between them and which are, for example, four in number distributed 90° apart about the longitudinal axis of the external wall. At least some of these members may comprise orifices for mounting arms through which auxiliaries can pass such as pipes for the flow of fluid and electric cables.

Advantageously, the external wall comprises another downstream ring fixed to the support structure and comprising link rods for connecting to the exhaust case of the turbomachine. The link rods support and center the engine, and allow the exhaust case to expand axially and radially in operation.

The internal wall of the fan duct is not a load transmitting component and its framework and its removable panels are, for example, made of sheet. The removable panels of the internal wall are substantially aligned with the openings in the external wall so as to facilitate maintenance operations on the equipment mounted on the turbomachine spool. The longitudinal connecting elements of the framework of the internal wall comprise orifices for mounting the arms through which auxiliaries can pass, these orifices being radially aligned with the corresponding orifices in the members of the external wall.

The invention also relates to a turbomachine, such as an airplane turbojet, and which comprises a fan duct as described hereinabove.

As a preference, the upstream ends of the internal wall and external wall of the duct are attached to annular flanges of the intermediate case of the turbomachine, and the downstream end of the internal wall is attached to an upstream flange of the exhaust case by radial lugs leaving an annular ventilation space around the exhaust case. The downstream end of the external wall is connected to the exhaust case by link rods allowing this case to expand axially and radially in operation. The downstream end of the external wall may also be attached to the upstream end of a thrust reverser extending around the exhaust case.

The invention also proposes a method of mounting a fan duct as described hereinabove in a turbomachine such as an airplane turbojet, this method consisting:

in attaching the upstream annular structure of the internal wall to a flange of the intermediate case, then in fixing the downstream annular structure of the internal wall to a flange of the exhaust case, and in connecting these structures using longitudinal connecting elements, then in fitting the individual support structure of the external wall, by axial translation in the direction from downstream to upstream, and in attaching the upstream end of this structure to an annular flange of the intermediate case, in mounting the auxiliaries and their through-arms in the corresponding orifices in the internal and external walls, in fitting the ring comprising the link rods for connecting to the exhaust case on the downstream end of the external wall and attaching it thereto, then in fitting the cowling sheets that surround the link rods on the downstream end of the internal wall and attaching them thereto, in fitting the panels of the internal wall, by passing them through the openings in the external wall, and in attaching them, then fitting and attaching the panels of the external wall.

BRIEF DESCRIPTION OF THE DRAWINGS

The invention will be better understood, and other details, features and advantages of the present invention will become apparent from reading the following description given by way of nonlimiting example with reference to the attached drawings in which.

DESCRIPTION OF THE PREFERRED EMBODIMENT

Figure 1:
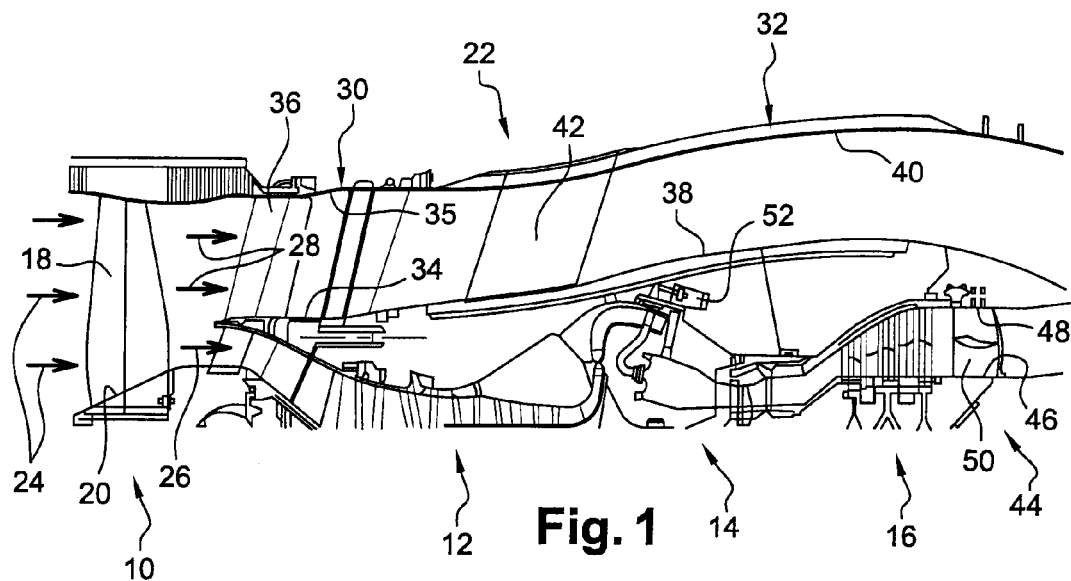
FIG. 1 is a partial schematic half view in axial section of a bypass turbojet fitted with a fan duct according to the prior art.

FIG. 1 schematically depicts a bypass turbojet comprising, from the upstream end downstream, in the direction in which the gases flow within the turbojet, a fan 10, a compressor 12, a combustion chamber 14 and turbines 16, this turbojet being intended to be attached by appropriate means under a wing of an airplane or to the rear part of the fuselage of an airplane.

The fan 10 comprises a plurality of blades 18 which are fixed at their radially internal ends to the periphery of the fan disk 20 of the turbojet secured to the upstream end of a shaft (not depicted) of the turbojet. The fan blades 18 are externally surrounded by a retaining case mounted at the upstream end of the nacelle 22 of the turbojet which is substantially cylindrical and extends in the downstream direction around the compressor 12, the combustion chamber 14 and the turbines 16 of the turbojet.

This nacelle 22 ducts the air stream 24 entering the turbojet. Some 26 of this air stream, which forms the primary air stream or hot air stream, enters the compressor 12, the last stage of which is centrifugal, and is then mixed with fuel and burnt in the combustion chamber 14, in order thereafter to be injected into the turbines 16 in order to provide energy to the rotor blades of the turbines and drive the compressor and fan shaft.

The remainder 28 of the air stream entering the turbojet, which forms the bypass air stream or cold air stream, flows around the turbojet spool inside an intermediate case 30 then inside a fan duct 32, and is used to supply the ventilation and cooling circuits and to provide additional thrust which combines with the thrust supplied by the combustion gases ejected from the turbines 16.

The intermediate case 30 comprises two coaxial cylindrical shrouds 34, 35, these being an internal shroud and an external shroud, respectively, which are joined together by radial arms or blading 36.

The fan duct 32 is formed of two substantially cylindrical walls 38, 40 which run coaxially one inside the other and are connected to one another by tubular radial arms 42 through the inside of which auxiliaries such as pipes for the circulation of fluids and electric cables run.

The external wall 40 of the fan duct is attached at its upstream end to the downstream end of the external shroud 35 of the intermediate case and at its downstream end to the upstream end of a thrust reverser (not depicted). Its internal wall 38 is attached at its upstream end to the downstream end of the internal shroud 34 of the intermediate case, and at its downstream end to an exhaust case 44 mounted at the exit from the turbines 16. Like the intermediate case 30, the exhaust case 44 comprises two coaxial cylindrical shrouds 46, 48, these being an internal shroud and an external shroud, respectively, joined together by radial blading 50.

The internal wall 38 of the duct comprises access openings for accessing equipment mounted on the turbojet spool, such as fuel injectors 52 and actuators for controlling variable pitch blades, for example, these access openings being closed by removable panels (not depicted).

Figure 2:
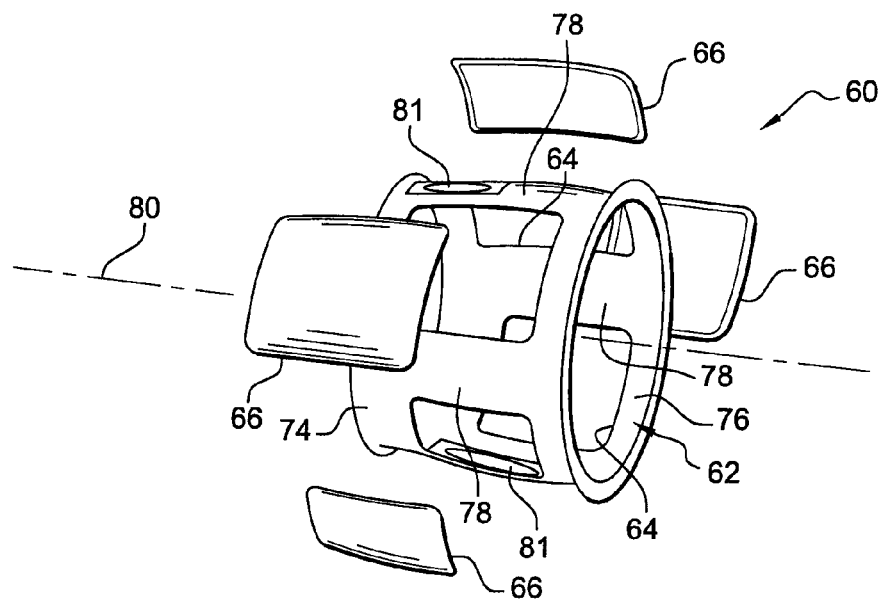
FIG. 2 is a schematic perspective exploded view of an external cylindrical wall of a fan duct according to the invention.
Figure 3:
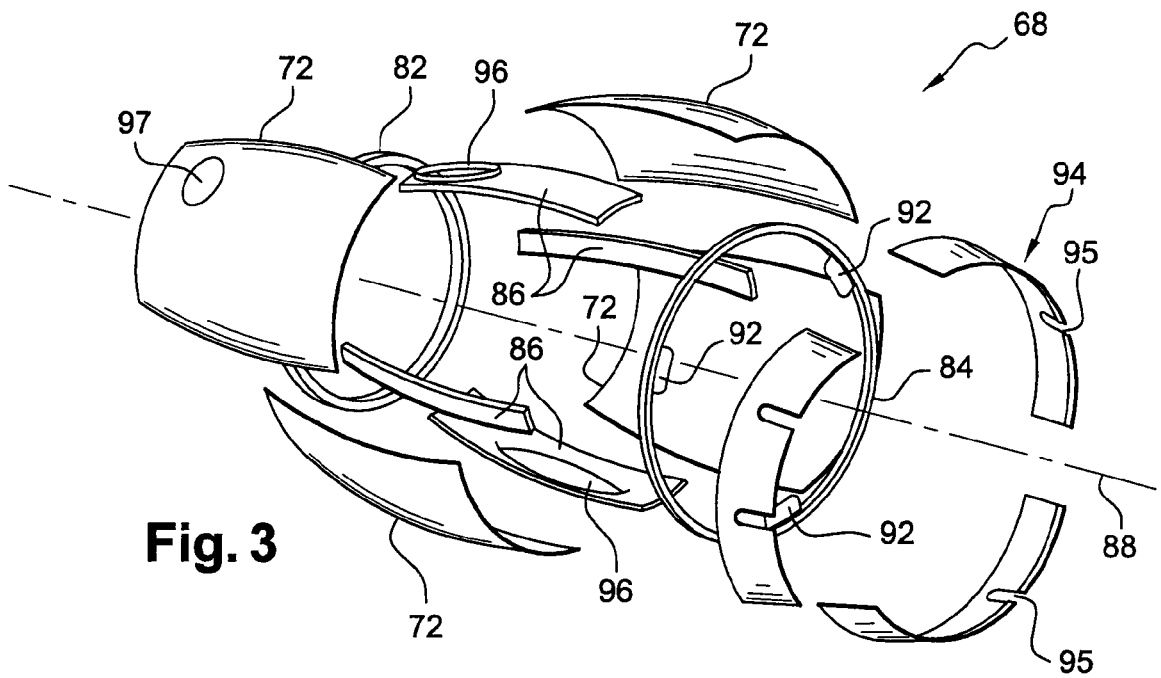
FIG. 3 is a schematic perspective exploded view of an internal cylindrical wall of a fan duct according to the invention.
Figure 4:
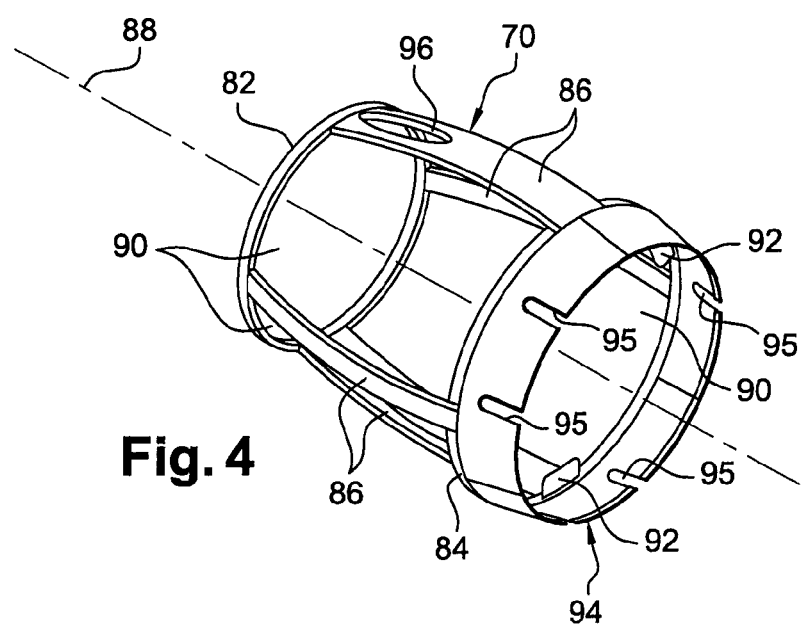
FIG. 4 is a schematic perspective view of the framework of the internal wall of FIG. 3.

In the embodiment of the invention depicted in FIGS. 2 to 4, the external wall 60, (FIG. 2) of the duct comprises a single and rigid support structure 62 comprising large-sized openings 64 which can be closed off by removable panels 66, and its internal wall 68 (FIGS. 3 and 4) is formed of pieces of sheet or composite material assembled with one another to form a framework 70 to which panels 72 are removably attached.

The support structure 62 of the external wall is substantially cylindrical and comprises an upstream ring 74 and a downstream ring 76 which are rigidly joined together by members 78 of elongate shape running parallel to the longitudinal axis 80 of the external wall, these members between them and with the rings 74, 76 delimiting the aforementioned openings 64 in the support structure. In the example depicted, these members 78 are four in number and are uniformly distributed about the axis 80 to delimit four substantially identical openings 64.

Two diametrically opposed longitudinal members 78 comprise orifices 81 for mounting the radially external ends of tubular, radial arms (not depicted) for carrying auxiliaries.

The removable panels 66 of the external wall 60 are attached by screws or bolts to the support structure 62 in such a way that their radially internal faces lie flush with the interior surface of the support structure so as to limit pressure drops as the bypass air flows.

The way in which the support structure 62 is attached to the intermediate case 30 and to the thrust reverser, and the way it is connected to the exhaust case 44, will be described in greater detail below with reference to FIGS. 5 to 10. This support structure 62 is rigid enough that, in operation, on the one hand, it can withstand the loads transmitted by the engine and by the thrust reverser and, on the other hand, it can transmit load between the turbojet and the airplane fitted with this turbojet.

The cross section of the internal wall 68 (FIGS. 3 and 4) increases from its upstream end to its middle region, situated level with the centrifugal stage of the turbojet compressor, then decreases as far as its downstream end, the overall shape of the internal wall being a barrel shape.

The framework 70 of the internal wall 68 of the duct is formed of two coaxial annular structures 82, 84, these being an upstream structure and a downstream structure, respectively, which are connected to one another by elements 86 of elongate shape which run parallel to the longitudinal axis 88 of the internal wall. These elements between them and with the annular structures 82, 84 delimit apertures 90 for accessing the aforementioned equipment mounted on the turbojet spool.

In the exemplary embodiment depicted, these longitudinal elements 86 are four in number and are uniformly distributed about the axis 88 of the internal wall so as to form four substantially identical apertures 90 intended to be substantially radially aligned with the openings 64 in the external wall.

Two of these longitudinal elements 86 comprise orifices 96 radially aligned with the orifices 81 in the external wall 60 for mounting the radially internal ends of the radial arms that carry the auxiliaries.

The internal wall 68 of the duct further comprises a downstream frustoconical cowling 94 made of sheet or composite material, formed of three sectors, the upstream ends of which are attached to the downstream annular structure 84 of the framework 70. This cowling 94 at its downstream end comprises radial cutouts 95 for the passage of means for suspending the exhaust case 44 from the support structure 62 of the external wall.

The removable panels 72 of the internal wall 68 are attached by screws or bolts or any other quick-fastening system to the framework 70 and some of them have holes 97 for bleeding air from the bypass air stream. The dimensions of these panels 72 are such that they can be disassembled and removed from the internal wall through the openings 64 in the external wall.

As described in greater detail below, the upstream annular structure 82 is intended to be attached to the internal shroud of the intermediate case 30 and the downstream annular structure comprises internal radial lugs 92 for attachment to the external shroud of the exhaust case 44. These lugs are, for example, three in number and are uniformly distributed about the axis 88, some distance apart, to allow air for ventilating the exhaust case 44 to pass between them.

FIGS. 5 to 10 illustrate the steps in the method of assembling the fan duct according to the invention on a bypass turbojet.

Figure 5:
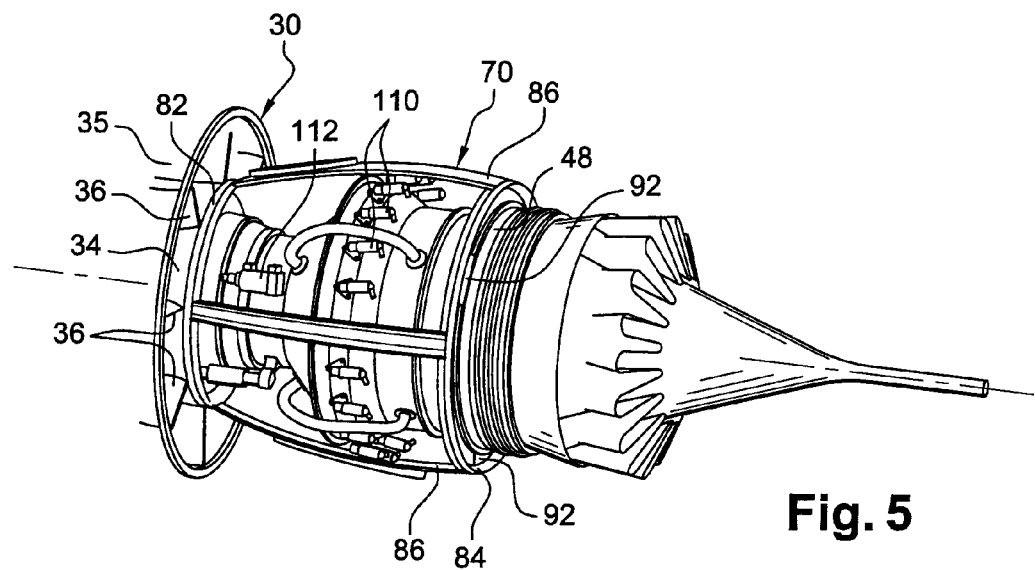
FIGS. 5 to 10 are schematic perspective views of a bypass turbojet and illustrate the stages of mounting the fan duct of FIGS. 2 to 4 on the spool of the turbojet.
Figure 6:
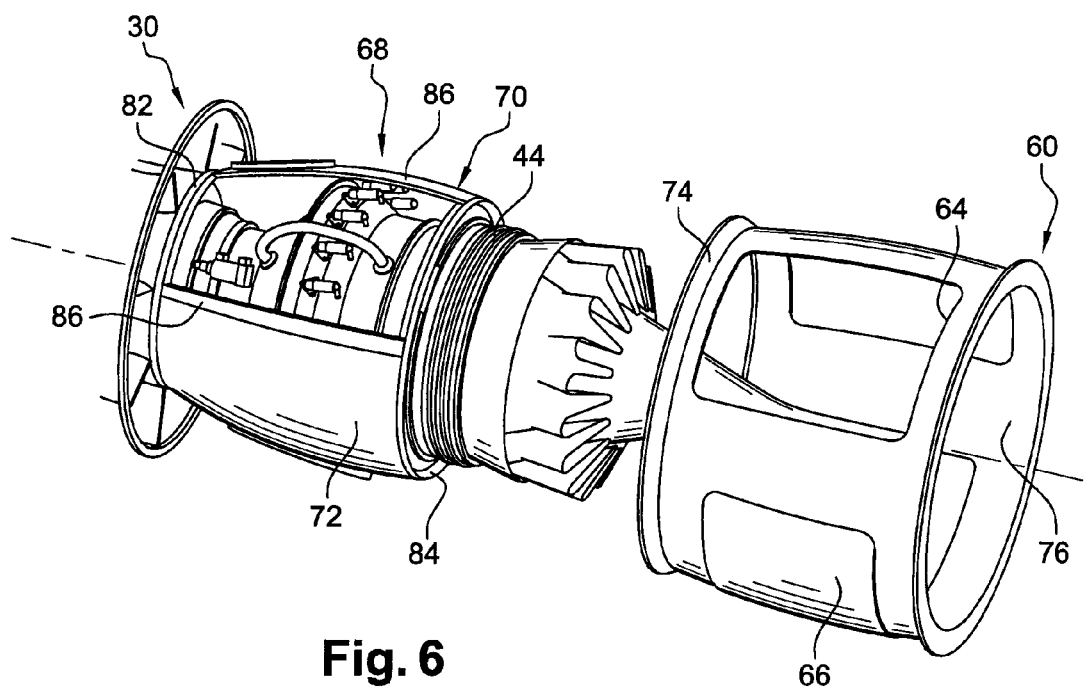

The first step depicted in FIG. 5 consists in using means of the screw/nut type to attach the upstream annular structure 82 of the internal wall to a corresponding annular flange of the internal shroud 34 of the intermediate case 30, in attaching the attachment lugs 92 of the downstream annular structure 84 of the internal wall to corresponding means provided on the external shroud 48 of the exhaust case 44, then in attaching the longitudinal connecting elements 86, at their ends, to the upstream structure 82 and to the downstream structure 84. The framework 70 of the internal wall is thus assembled and attached to the turbojet spool.

The method then consists (FIG. 6) in offering up the support structure 62 of the external wall around the framework 70 of the internal wall, moving it axially from the downstream end around the framework of the internal wall, then in bolting an upstream annular flange of the support structure to a corresponding annular flange of the external shroud 35 of the intermediate case 30.

Figure 7:
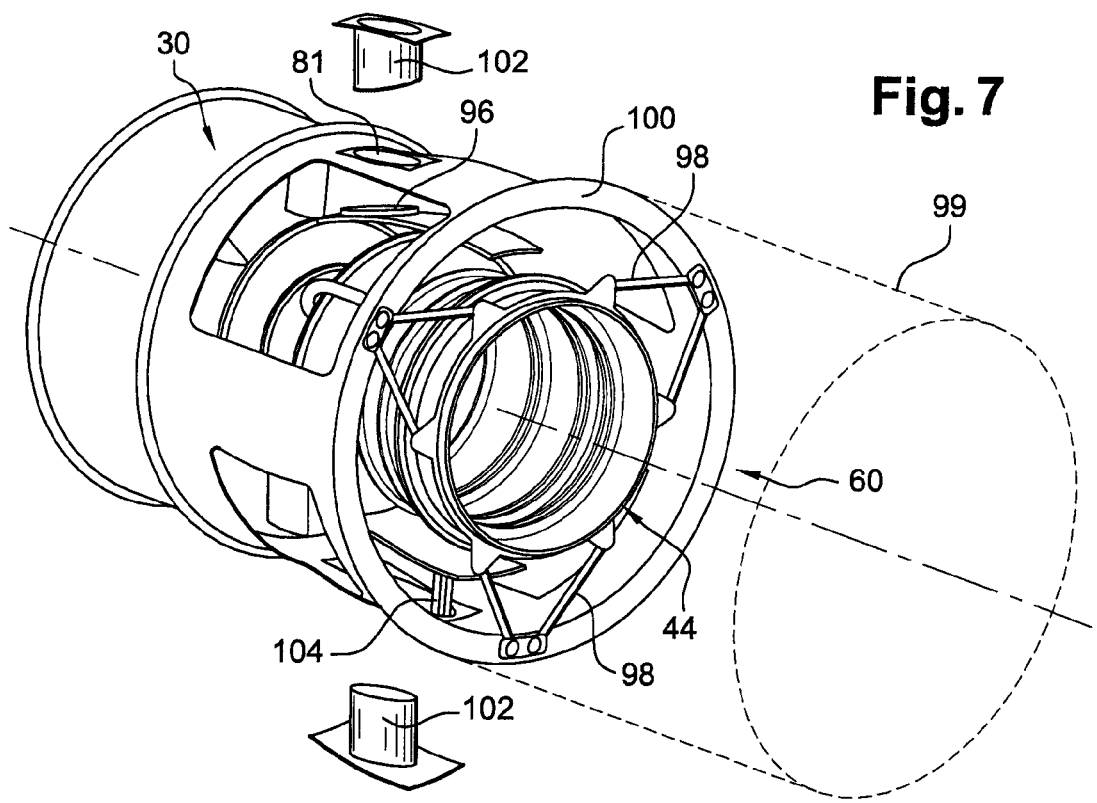
Figure 8:
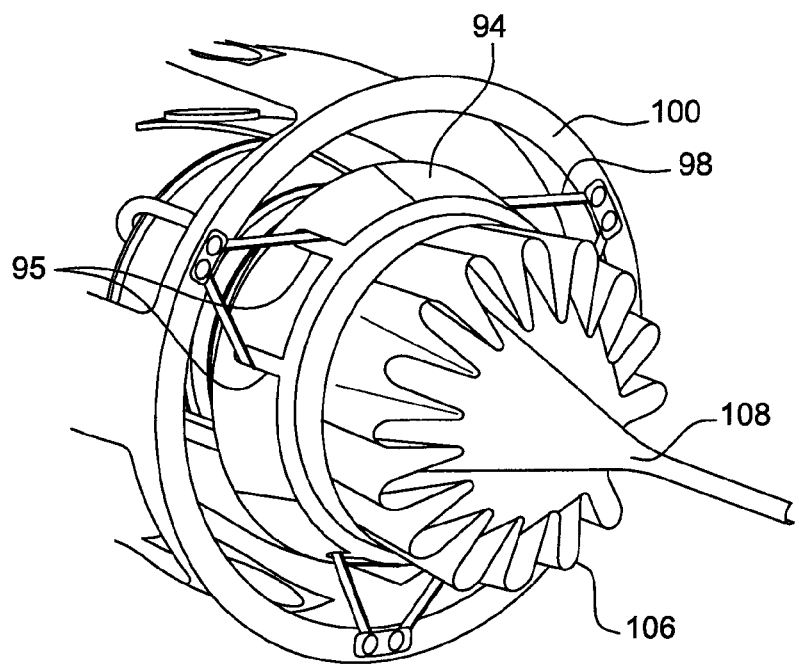
Figure 9:
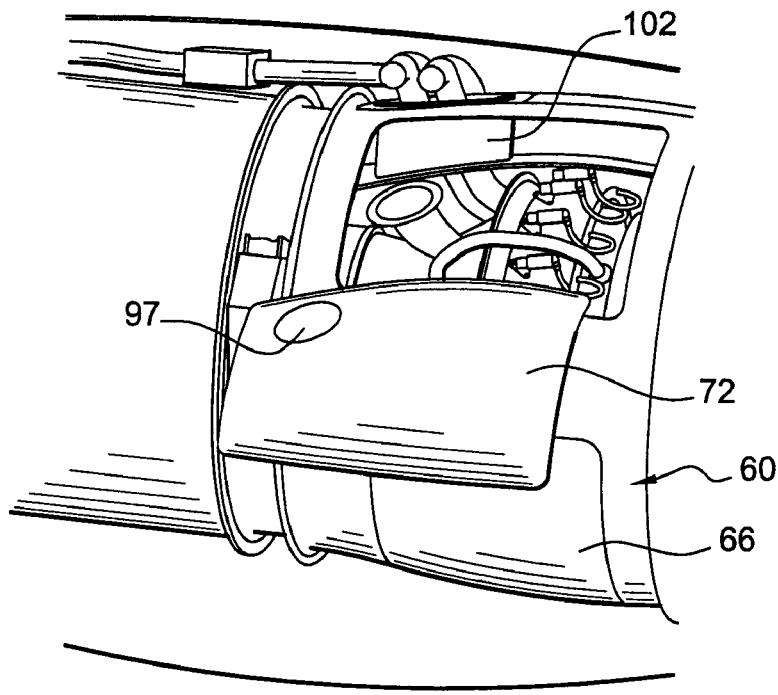

The downstream end of the support structure 62 is bolted to the upstream end of a thrust reverser depicted schematically using dotted line 99 in FIG. 7.

The downstream end of the support structure 62 is also attached to the exhaust case 44 by load-transmitting link rods 98, these link rods being attached at one of their ends to the exhaust case 44 and connected at the other of their ends to a ring 100 attached and fixed coaxially to the downstream end of the support structure 62. In operation, these link rods 98 support and center the exhaust case, and allow it to expand axially and radially in operation.

In the example depicted, the link rods are six in number and all run in the same transverse plane, connected in pairs, the radially external ends of the link rods of each pair being at a circumferential distance from one another that is shorter than the circumferential distance between their radially internal ends.

Tubular arms 102 are fitted radially from the outside into the orifices 81 and 96 in the external and internal walls and are attached to these walls by appropriate means. Auxiliaries 104 may be mounted inside these arms.

The sectors of the sheet cowling 94 (FIG. 8) are then attached at their upstream ends to the downstream annular structure 84 of the framework 70 of the internal wall in such a way that these link rods 98 pass through the aforementioned cutouts 95 in this cowling.

This cowling 94 externally surrounds the upstream part of a mixer 106 which is shaped in such a way as to mix the gases ejected from the turbines, around an exhaust cone 108, with the stream of air leaving the fan duct.

Figure 10:
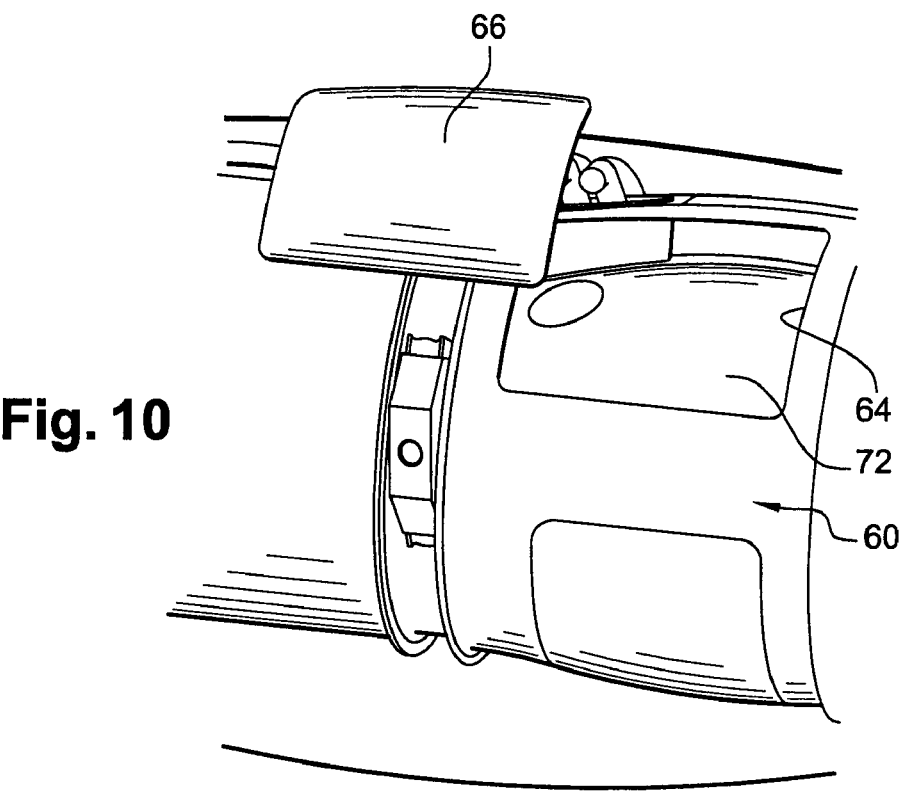

The method then consists (FIG. 9) in fitting and attaching the removable panels 72 to the framework 70 of the internal wall in such a way as to close off the apertures 90 in this framework, then finally in using the removable panels 66 to close off the openings 64 in the support structure 62 (FIG. 10).

The method of dismantling the fan duct according to the invention consists in performing the aforementioned steps again, but in reverse order.

In order to carry out maintenance operations on equipment mounted on the turbojet spool, such as fuel injectors 110 and actuators 112 for controlling variable pitch blades in particular (FIG. 5), all that is required is for the panels 66 of the external wall to be disconnected and removed, and then for the panels 72 of the internal wall to be disconnected and removed through the openings 64 in the external wall.

The invention claimed is:

1. A fan duct for a turbomachine, comprising:
an internal cylindrical wall; and
an external cylindrical wall coaxial with the internal cylindrical wall, the internal and external cylindrical walls are intended to be attached at a first end to an intermediate case of the turbomachine and to be connected at a second end to an exhaust case of the turbomachine,
wherein, to make it easier to mount the duct and allow access to equipment mounted on the spool of the turbomachine, the internal cylindrical wall is made up of first removable panels attached to a framework comprising an upstream annular structure, a downstream annular structure and longitudinal elements connecting said upstream and downstream annular structures,
wherein the external cylindrical wall comprises openings closed by second panels attached removably to a single support structure, these openings having dimensions that allow said first removable panels of the internal wall through and which allow said first removable panels to be mounted on and removed from the framework of the internal wall, wherein the support structure of the external wall comprises an upstream ring and a downstream ring which are rigidly connected by longitudinal members defining the aforementioned openings between them, and wherein the internal cylindrical wall includes a downstream frustoconical cowling, an upstream end of the cowling is attached to the downstream annular structure of the framework and a downstream end of the cowling includes radial cutouts.

2. The fan duct as claimed in claim 1, wherein the single support structure of the external wall is a rigid structure used to transmit load between the turbomachine and an airplane fitted with this turbomachine.

3. The fan duct as claimed in claim 1, wherein the framework and the first removable panels of the internal wall are made of sheet.

4. The fan duct as claimed in claim 1, wherein the members are four in number distributed 90° apart about the longitudinal axis of the external wall.

5. The fan duct as claimed in claim 1, wherein at least some of the members comprise orifices for mounting arms through which auxiliaries can pass.

6. The fan duct as claimed in claim 5, wherein the longitudinal connecting elements of the internal wall comprise orifices for mounting the arms.

7. The duct as claimed in claim 1, wherein the first removable panels of the internal wall are circumferentially aligned with the openings in the external wall.

8. The duct as claimed in claim 1, wherein the external wall comprises a downstream ring fixed to the support structure and comprising link rods for connecting to the exhaust case of the turbomachine.

9. A turbomachine, which comprises a fan duct as claimed in claim 1.

10. The turbomachine as claimed in claim 9, wherein the upstream ends of the internal wall and external wall of the duct are attached to annular flanges of the intermediate case of the turbomachine, and wherein the downstream end of the internal wall is attached to an upstream flange of the exhaust case by radial lugs leaving an annular ventilation space around the exhaust case.

11. The turbomachine as claimed in claim 9, wherein the downstream end of the external wall is connected to the exhaust case by link rods allowing this exhaust case to expand axially and radially in operation.

12. The turbomachine as claimed in claim 9, wherein the downstream end of the external wall is attached to a thrust reverser extending around the exhaust case.

13. A method of mounting a fan duct in a turbomachine, comprising:

attaching an upstream annular structure of an internal cylindrical wall of the fan duct to a flange of an intermediate case, then fixing a downstream annular structure of said internal wall to a flange of an exhaust case, and connecting said upstream and downstream annular structures using longitudinal connecting elements, fitting an individual support structure of an external cylindrical wall of the fan duct, by axial translation in the direction from downstream to upstream, and attaching an upstream end of said individual support structure to an annular flange of the intermediate case, mounting auxiliaries and through-arms of said auxiliaries in corresponding orifices in the internal and external walls, fitting a ring comprising link rods for connecting to the exhaust case on a downstream end of the external wall and attaching said ring to the downstream end of the external wall, then fitting cowling sheets that surround the link rods on the downstream end of the internal wall and attaching said cowling sheets to the downstream end of the internal wall, fitting first removable panels of the internal wall, by passing them through the openings in the external wall, and attaching said first removable panels, then fitting and attaching second panels of the external wall.

* * * * *